United States Patent Office 3,357,790
Patented Dec. 12, 1967

3,357,790
CALCINING METHOD FOR CONVERSION OF ALKALINE EARTH ORTHOPHOSPHATES TO THE PYROPHOSPHATE FORM
Elerington Saunders, St. Louis, and Felix Wright, Kirkwood, Mo., assignors to Monsanto Company, a corporation of Delaware
No Drawing. Filed Mar. 18, 1963, Ser. No. 266,005
9 Claims. (Cl. 23—108)

This invention relates to the manufacture of alkaline earth metal pyrophosphates. More particularly, the present invention relates to novel calcining processes for manufacturing an improved dentifrice grade of such pyrophosphates, to novel intermediate compositions for use in such processes, and to the improved products resulting from such processes.

The advantages that result from the utilization of dentifrice cleansing and polishing compositions (such as toothpastes and toothpowders) containing fluorides and stannous compounds in combination with alkaline earth metal pyrophosphates are well known. In order for these dentifrice compositions to retain their therapeutic efficacy over a prolonged period of time after they have been manufactured, the pyrophosphate polishing agent must have a high degree of compatibility with the stannous and fluoride ions in the dentifrice compositions. Although the alkaline earth metal pyrophosphates (such as calcium pyrophosphate) that are manufactured via conventional processes can be utilized to a certain extent in combination with stannous and fluoride compounds in dentifrice compositions, their use in such compositions is not especially desirable in instances where the compositions should have extremely prolonged shelf lives. This is because, upon such prolonged storage, the conventional alkaline earth pyrophosphate polishing agents in the dentifrice compositions react with the stannous and fluoride ions, so that their therapeutic value in protecting teeth against decay is eventually largely lost. This ability, or the more desirable inability, of alkaline earth metal pyrophosphates to react with dissolved stannous and fluoride ions is spoken of in terms of compatibility of the particular pyrophosphate compound with such dissolved ions. Thus, it can readily be appreciated that generally the more compatible a particular pyrophosphate material is, the more valuable and useful is the material in therapeutic dentifrice compositions that also contain soluble stannous and/or fluoride compounds. However, compatibility is not the sole essential criterion for judging acceptably useful dentifrice abrasives. The "compatible" abrasives must also have a sufficiently low ability to abrade teeth (herein ability to abrade is termed "degree of abrasiveness"), so that dentifrice compositions containing them do not erode teeth enamel at an excessively high rate.

It is an object of the present invention to provide novel processes for the manufacture of improved dental abrasive grade alkaline earth metal pyrophosphates, which pyrophosphates have unexpectedly high compatibility with stannous and fluoride ions, as well as an acceptably low degree of abrasiveness.

It is another object of the present invention to provide novel intermediate compositions that are useful in the aforesaid novel processes for the manufacture of such improved alkaline earth metal pyrophosphates.

It is still another object of the present invention to provide novel dentifrice grade alkaline earth metal pyrophosphates having unexpectedly high compatibility with stannous and fluoride ions.

These objects, as well as others which will become apparent from the following description and claims, can be accomplished by utilizing in physical contact with the alkaline earth metal orthophosphate "raw" materials (which are to be converted via a calcining technique into the corresponding dentifrice grade alkaline earth metal pyrophosphate products) certain amounts of water-soluble alkali metal cations. The term "alkali metal cations" as herein utilized includes lithium, sodium, potassium, rubidium, cesium, and francium, as well as ammonium cations.

As it was stated hereinbefore, the present invention relates to specific improvements in conventional processes for manufacturing alkaline earth metal pyrophosphates; especially calcium pyrophosphate; suitable for use as dental abrasive in, for example, toothpaste and toothpowder compositions; and particularly to those dentifrice compositions that also contain soluble or dissolved stannous and/or fluoride compounds. These conventional processes are well known in the art and comprise a calcining step wherein an appropriate monobasic dialkaline earth metal orthophosphate is molecularly dehydrated at a temperature below its melting point to yield the corresponding alkaline earth metal pyrophosphate. These appropriate dialkaline earth metal orthophosphate materials include, for example, dimagnesium orthophosphate ($MgHPO_4$), dicalcium orthophosphate ($CaHPO_4$), distrontium orthophosphate ($SHPO_4$), and the like, as well as any of their hydrated forms. The dialkaline earth metal orthophosphates should preferably represent the major part of the "raw" materials in the improved calcining processes of the present invention. For example, the dialkaline earth metal orthophosphate "raw" materials that are to be subjected to heat in the calcining step of this invention should preferably consist of practically pure dialkaline earth metal orthophosphate compounds and/or their hydrates, and should contain at most about 10 weight percent, and preferably at most about 5 weight percent, of "impurities" (i.e., materials other than molecularly dehydratable alkaline earth metal orthophosphates and pyrophosphates), such as some unreacted lime, and some monoalkaline earth metal orthophosphates. Larger amounts of such "impurities" can be present in these "raw" materials, however, without completely precluding the benefits that can result from practicing the processes of this invention.

While the actual beneficial effect (in so far as the amount or degree of improvement in compatibility of the final pyrophosphate products is concerned) of practicing the present invention varies to some extent depending upon the particular alkali metal cation that is utilized, as well as the particular chemical form in which the alkali metal cation is utilized, any compound containing alkali metal (including $NH^+_4$) cations which, when the compound is placed in distilled water at about 26° C. and at the level of about 1 weight percent, releases at least about 500 p.p.m. of its alkali metal cations into solution can be utilized as the source of alkali metal cations in the practice of the present invention. This includes both organic and inorganic materials, although inorganic materials are generally preferred. Also, preferred sources of alkali metal cations are those compounds which, when intermixed with distilled water at about 26° C. and at a level of about 1 weight percent, are either about neutral or basic (i.e., have pH's of at least about 6.5). While acidic compounds can also be used in the practice of this invention, a discussion of the utility of this particular subject matter appears in considerably greater detail in copending patent application Ser. No. 266,006, filed concurrently herewith in the names of one of the present inventors and one other. In this copending patent application, benefits resulting from the use of any acidic material in a sufficient amount in calcining processes for the manufacture of novel dentifrice grade alkaline earth metal pyrophosphate compositions is extensively disclosed.

Typical, non-limiting examples of compounds that can be used as the source of alkali-metal cations in the practice of the present invention include such inorganic compounds as the alkali metal salts of the mineral acids, such as the alkali metal halides (including sodium chloride, sodium iodide, sodium fluoride, and sodium bromide), the alkali metal sulfates (such as sodium sulfate), the alkali metal nitrates (such as sodium nitrate), and the alkali metal phosphates (such as disodium orthophosphate and trisodium orthophosphate); the alkali metal bases, such as the alkali metal hydroxides (i.e., NaOH), the alkali metal oxides and peroxides (such as $Na_2O$ and $Na_2O_2$), and the alkali metal carbonates and bicarbonates (such as $Na_2CO_3$ and $NaHCO_3$); the basic and neutral alkali metal polyphosphates (such as $Na_5P_3O_9$, $Na_4P_2O_7$, $Na_5P_3O_{10}$, $(NaPO_3)_x$, and $Na_7P_4O_{12}$); as well as any other inorganic alkali metal salt that meets the foregoing requirements as to pH and solubility in water (including, for example, $Na_2S$, $NaClO$, $NaClO_3$, $NaClO_4$, $NaBrO$, $NaBrO_3$, $NaBrO_4$, $NaIO$, $NaIO_3$, $NaIO_4$, $Na_2MoO_4$, $Na_2Mo_2O_7$, $Na_2Mo_3O_{10}$, $Na_3Mo_9O_{13}$, $NaAlO_2$, $Na_2SiO_3$, $Na_2Cr_2O_7$, $Na_3CrO_8$, $NaMnO_4$, $Na_2MnO_4$, $NaReO_4$, $Na_2UO_5$, $Na_2CrO_3$, $NaCl \cdot AlCl_3$, $NaF \cdot AlF_3$, $NaAl(SO_4)_2$, $NaNH_2$, $NaNH_4HPO_4 \cdot 4H_2O$, $NaSbO_3 \cdot 7H_2O$, $NaN_3$, $Na_2B_4H_{10}$, $NaBO_2$, $Na_2B_4O_7$, $NaBO_3$, $Na_2Ca(SO_4)_2$, $Na_2C_2$, $NaAuCl_4 \cdot 2H_2O$, $Na_2PtCl_6$, $Na_3RhCl_6$, $Na_2CrO_4$, $NaAuS \cdot 4H_2O$, $NaH$, $NaNCO$, $Na_3N$, $Na_2N_2O_2$, $NaNO_2$, $Na_2(NO)Fe(CN)_5 \cdot 2H_2O$, $Na_3P$, $NaPO_3$, $Na_2Si_2O_5$ $Na_2Si_4O_9$, $Na_2SiF_6$, $Na_2SnO_3 \cdot 3H_2O$, $Na_2S_2O_7$, $Na_2S_2O_8$, $Na_2S_4$, $Na_2S_5$, $Na_2S_2O_4 \cdot 2H_2O$, $Na_2SO_3$, $Na_2S_2O_5$ $Na_2TeO_3$, $Na_2S_2O_6$, $Na_2S_2O_3$, $Na_2WO_4$, $Na_3VO_4$, and the like, as well as their various hydrates and crystalline forms. Such water-soluble alkali metal cation-containing materials as sodium acetate, sodium oxalate, sodium tartrate, sodium benzoate, sodium ethylate, sodium methylate, sodium formate, sodium lactate, sodium citrate, and the like can be utilized to advantage in the practice of this invention. These materials are organic in nature.

In the foregoing discussion of alkali metal cation source material, only sodium was specifically named. It should be understood however that any of the other alkali metal cations can be substituted for sodium in the above discussion. The compounds containing a mixture of alkali metal cations can be substituted for all or some of the sodium cations.

Of these, the alkali-metal salts of mineral acids are generally preferred, while still further preferred are the sodium and potassium salts of the halogen acids (such as NaCl, KCl, NaBr, KBr, NaI, KI), and the di- and trisodium and potassium orthophosphates. For mainly economic reasons, of the alkali-metal cation-containing compounds that can be used in the practice of the present invention, those that are preferred are those approximately neutral or basic compounds that contain water-soluble sodium and/or potassium cations.

Generally, in the practice of the present invention, at least about 650 p.p.m. of soluble alkali metal cations (based on the total solids) should be present in the dialkaline earth metal orthophosphate "raw" material that is to be converted to the corresponding desired pyrophosphate in the calcining step of the improved processes of this invention. In order to minimize the amount of "impurities" or diluents in the dialkaline earth metal pyrophosphate products of this invention, it is generally preferred that not more than about 20,000 p.p.m. of soluble alkali metal cations be utilized in the aforementioned "raw" materials. However, for optimum results in the practice of the invention, it is generally preferred that from about 750 to about 4000 p.p.m. of water-soluble alkali metal cations be utilized.

As a general rule, the use of higher levels of soluble alkali metal cations results in the production of alkaline earth metal pyrophosphate products having somewhat higher abrasiveness, as compared with the use of lower levels of soluble alkali metal cations. One noteworthy exception to this general rule, is the use of potassium halides; especially potassium chloride. For some unexplained reason, the use of different levels of potassium (in the form of the potassium halide salts) in the practice of this invention apparently has practically no effect on abrasiveness. Therefore, when potassium halide salts are used in the practice of this invention, considerably more potassium cations can be used beneficially than was heretofore indicated for soluble alkali metal cations generally. For example, up to about 5 weight percent, and preferably from about 0.0015 to about 2.5 weight percent of potassium halide salts can be used without detracting substantially from the benefits that can result from practicing the present invention.

In determining the total amounts of such water-soluble alkali metal cations it should be noted that the above figures represent the combined total of all water-soluble alkali metal cations in the dialkaline earth metal orthophosphate compositions that are to be calcined in the production of the desired alkaline earth metal pyrophosphate of this invention.

The total amounts of water-soluble alkali metal cations in the dialkaline earth metal orthophosphate compositions are determined by the following procedure:

*Procedure for determining water-soluble alkali metal cations*

Into a 250 ml. Ehrlenmeyer flask are poured 100 mls. distilled water and 5 grams of the monobasic dialkaline earth metal orthophosphate material. The flask is then stoppered, and shaken for 24 hours at room temperature on a Burrell wrist-action shaker. At the end of this time, the resulting slurry is centrifuged to settle the solids. Then standard techniques for the determination of the particular alkali metal cation or cations of interest are applied to the resulting clear supernatant liquor. For example, in an analysis for soluble $Na^+$, 5 mls. of the supernatant liquor is placed in a 100 ml. volumetric flask, along with 5 mls. of a 5000 p.p.m. standard $Li^+$ solution. After the volumetric flask is made up to volume, its contents are analyzed for $Na^+$ by a standard flame photometric procedure.

It is of interest to note that although generally the abrasiveness of the alkaline earth metal pyrophosphate products increases to some extent with increasing levels of water-soluble alkali metal cations in the "raw" orthophosphate materials that are used in the calcining step of the processes of this invention, this effect is not observed when the source of alkali metal cations is potassium halide salts; particularly potassium chloride. Consequently, the utilization of potassium halide salts, and preferably potassium chloride constitutes a still further preferred embodiment of this invention.

The particular manner in which the dialkaline earth metal orthophosphate compositions (which contain the water-soluble alkali metal cations in amounts that appear necessary for the successful practice of this invention) are prepared is apparently not at all critical in so far as the successful practice of the invention is concerned. They can be manufactured, for example, by simply intermixing in a conventional mixing equipment the compound or compounds from which the water-soluble alkali metal cations are derived with any particular appropriate dialkaline earth metal orthophosphate desired, in amounts which will furnish or provide the proper amounts of water-soluble alkali metal cations into the resulting mixture. Although these materials do not have to be blended extensively, generally the more thoroughly the alkali metal cations are blended through the dialkaline earth metal orthophosphate "raw" materials, the more compatible is the pyrophosphate products finally resulting therefrom (assuming other factors are the same). Consequently, a preferred method of combining the compound or mixture of compounds (which serve as the source of the water-soluble alkali metal cations) with the water-insoluble dialkaline earth metal orthophosphate "raw" material is via blending into the orthophosphate "raw" material an aqueous solution containing the dissolved alkali metal cations. The water from this solution can subsequently be removed from the resulting mixture, if desired, via a separate conventional drying step, or it can be removed in the early stages of the calcining step of the processes of this invention.

Preferred monobasic dialkaline earth metal orthophosphates for use in the practice of this invention are dicalcium orthophosphate monohydrate ($CaHPO_4 \cdot 2H_2O$) and dehydrated dicalcium orthophosphate dehydrate (as distinguished from dicalcium orthophosphate that has been prepared originally as the anhydrous salt).

Compositions comprising a major portion, i.e., preferably at least about 80 weight percent, and still more preferably at least about 95 weight percent of one or more of the monobasic dialkaline earth metal orthophosphate compounds described above (based on the weight of the composition just prior to the molecular dehydration of the orthophosphate, and not including any pyrophosphate materials that may be present therein) and at least about 650 p.p.m. of water-soluble alkali metal cations derived from any of the above-described neutral or basic salts that contain the water-soluble alkali metal cations, but preferably derived from inorganic alkali metal salts, constitute one of the preferred embodiments of this invention. Typical, but non-limiting examples of some of these preferred compositions (that are useful as intermediates in the preparation of improved dentifrice-grade alkaline earth metal pyrophosphates) of the present invention includes those shown in the following Table I. Figures shown in Table I represent weight percent of the respective materials in the compositions.

dicalcium orthophosphate (containing only about 200 p.p.m. of soluble sodium and no other detectable soluble alkali metal cations) is calcined under practically identical conditions.

EXAMPLE II

Five thousand parts of an intimate admixture (containing 1120 p.p.m. of water-soluble alkali metal ions) consisting of 0.4 weight percent of technical sodium nitrate and 99.6 weight percent of dehydrated precipitated dicalcium orthophosphate dihydrate are charged in stainless steel pans measuring 6″ x 3′ x 3′ are charged into a conventional electrically heated muffle furnace. Then the temperature of the mixture is gradually increased over a period of 180 minutes to 650° C., immediately after which the hot pans of materials are removed from the furnace and permitted to air cool to about 30° C., at which temperature, the product, calcium pyrophosphate, is removed from the pans and tested for its compatibility with stannous and fluoride ions. It is found to be 70% compatible with stannous ions and 86% compatible with fluoride ions.

A similar product, made in a practically identical manner as that of Example II, but in the absence of the added sodium nitrate is found to be 40% compatible with stannous ions and 58% compatible with fluoride ions.

EXAMPLE III

In a process such as that described in Example I, above, 2500 parts of powdered $MgHPO_4 \cdot 3H_2O$ are charged in place of the $CaHPO_4 \cdot 2H_2O$ utilized in Example I. At the same time, 15 parts of −200 mesh ammonium chloride are charged into the calciner. The calcining procedure described in Example I was then followed. The resulting magnesium pyrophosphate product

TABLE I.—PREFERRED CALCINER FEED "RAW" MATERIAL COMPOSITIONS

| Ingredient | Composition No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Dicalcium Orthophosphate Dihydrate [1] | 99.6 | | | 99.9 | | 99.75 | | 99.93 | | 99.9 | | |
| Anhydrous Dicalcium Orthophosphate [2] | | 99.0 | | | 99.75 | | | | 99.85 | | | |
| Anhydrous Dicalcium Orthophosphate [3] | | | 99.5 | | | | | | | | | |
| Dimagnesium Orthophosphate Trihydrate | | | | | | | | | | | 99.9 | |
| Potassium Chloride | 0.40 | | | | | | 99.8 | | | | | 99.75 |
| Sodium Nitrate | | 1.00 | 0.50 | | | | 0.10 | | | | | |
| Sodium Sulfate | | | | 0.10 | | | | | | | | |
| Ammonium Chloride | | | | | 0.25 | | | | | | | |
| Sodium Hydroxide | | | | | | 0.25 | | | | | | |
| Trisodium Orthophosphate | | | | | | | | 0.07 | | | | |
| Lithium Nitrate | | | | | | | | | 0.15 | | | |
| Sodium Chloride | | | | | | | 0.10 | | | 0.10 | | |
| Dipotassium Orthophosphate | | | | | | | | | | | | 0.25 |

[1] Prepared by conventional precipitation from water after reacting lime with phosphoric acid.
[2] Precipitated DCP·2H²O as in (¹) which has been previously dehydrated.
[3] Precipitated from hot water after reacting lime with phosphoric acid. (Precipitated in the anhydrous form.)

In the following examples, which are illustrative of some of the preferred embodiments of this invention, all parts are by weight unless otherwise specified.

EXAMPLE I

Into a direct fired, counter-current conventional rotary calciner are charged 2000 parts of a mixture containing 99.8 weight percent of finely divided (−200 mesh) technical grade dicalcium orthophosphate dihydrate and 0.2 weight percent of finely divided (−200 mesh) potassium chloride prepared by mechanically blending the dry powdered material for 10 minutes in a conventional ribbon blender. The termperature of the mixture in the calciner is then gradually, over a period of 60 minutes, increased to about 750° C. The resulting calcium pyrophosphate product is removed from the calciner and allowed to cool to about 26° C. It is found to be about 72% compatible with stannous ions and 88% compatible with fluoride ions. This is considerably improved over compatibilities of 35% with stannous ions and 52% with fluoride ions, which are demonstrated when 2000 parts of is found to be 60% compatible with stannous ions and 78% compatible with fluoride ions.

Any of the above-described sources of water-soluble alkali metal cations can be utilized in processes of this invention by simply utilizing, in preferably intimate physical contact with the particular dialkaline earth metal orthophosphate being converted to the desired dentifrice abrasive pyrophosphate product, an amount of the selected alkali metal compound within the ranges prescribed above, or by substituting the selected alkali metal compound for that one that is utilized in one of the foregoing examples.

In the formulation of finished dentifrice compositions in which the alkaline earth metal pyrophosphates of this invention are utilized, it is generally preferred that auxiliary agents be utilized that do not precipitate, complex, or otherwise react with stannous or fluoride ions. Toothpastes, for example, generally contain a sweetener such as saccharin, a flavoring agent, a humectant, a sudsing agent, and a binding agent. Generally, most conventional auxiliary agents are compatible with fluoride and stannous ions. For example, glycerine and sorbitol are excellent humectants for use in toothpastes in accordance with the present invention. Typically good binders are the very high molecular weight polyethylene oxides, hydroxyethylcellulose, and carboxymethylcellulose. Non-ionic sudsing agents such as the condensation product of tridecal alcohol with from 3–10 moles of ethylene oxide and sucrose monolaurate are also preferred.

In toothpastes, the level of alkaline earth metal pyrophosphate that is utilized generally varies from about 20 to about 60 weight precent, and preferably varies from about 30 to about 45 weight percent, of the composition. In toothpowders, generally higher amounts of the abrasive agent, often up to about 95 weight percent, are utilized. The amounts of stannous ions that should be utilized in dentifrice compositions (in which the alkaline earth metal pyrophosphates of this invention can be utilized to advantage) generally varies from about 1000 p.p.m. to about 10,000 p.p.m., and is preferably within the range of from about 2000 to about 5000 p.p.m. Generally, fluoride ions should be present or available in these dentifrice compositions at levels of from about 25 to about 4000 p.p.m.; or even higher levels, if desired; and should preferably be present therein at levels of from about 500 to about 2500 p.p.m.

Typical sources of stannous ions for use in the above-described dentifrice compositions include stannous fluoride, mixed stannous halides such as $Sn_2ClF_3$ and $SnClF$, as well as the fluorostannites. Fluoride ions in these dentifrice compositions can be derived from practically any water-soluble, relatively innocuous compound that can provide fluoride ions when it is dissolved in water. For example, they can be derived from water-soluble "simple" inorganic fluorides such as sodium fluoride, potassium fluoride, lithium fluoride, ammonium fluoride, indium fluoride, palladium fluoride, ferrous fluoride, cuprous fluoride, and the like, as well as from water-soluble fluoride-containing complexes such as sodium and potassium fluorosilicates, fluorozirconates, fluoroborates and fluorotitanates, and mixtures thereof.

What is claimed is:

1. A process for manufacturing calcium pyrophosphate suitable for use as a dentifrice abrasive which process comprises (1) intermixing dicalcium orthophosphate with a neutral to basic alkali metal inorganic compound selected from the group consisting of alkali metal halides, alkali metal sulfates, alkali metal nitrates, alkali metal orthophosphates, alkali metal polyphosphates, alkali metal bases, and mixtures thereof; said alkali metal compound being present in an amount sufficient to provide 750 p.p.m. to 4,000 p.p.m. of alkali metal content, based on the total solids in the resultant mixture, and being characterized in that when dissolved in distilled water at 26° C. at a concentration of 1% by weight, it will release alkali metal cations within the aforesaid range and will provide a pH of above about 6.5; and (2) calcining the resultant mixture at a temperature of from about 650° C. to about 750° C. for a period of from about 60 minutes to about 180 minutes, whereby said dicalcium orthophosphate is molecularly dehydrated to produce said calcium pyrophosphate.

2. In a process for manufacturing an alkaline-earth metal pyrophosphate suitable for use as a dentifrice abrasive wherein a monobasic dialkaline-earth metal orthophosphate is molecularly dehydrated by calcining at a temperature below the melting point of said pyrophosphate to form said pyrophosphate, the improvement which comprises incorporating in said monobasic dialkaline-earth metal orthophosphate, prior to calcining, a neutral to basic alkali metal compound in an amount sufficient to provide from 650 p.p.m. to 20,000 p.p.m. of alkali metal content based on said monobasic orthophosphate; said neutral to basic compound being further characterized in that when dissolved in distilled water at 26° C. at a concentration of 1% by weight, it will release alkali metal cations within the aforesaid concentration range and also provides a pH above 6.5.

3. The process as set forth in claim 2, wherein the neutral to basic alkali metal compound is an inorganic sodium compound and provides from about 750 to about 4,000 p.p.m. of sodium content.

4. The process as set forth in claim 2 wherein said monobasic dialkaline earth metal orthophosphate is dicalcium orthophosphate.

5. The process as set forth in claim 4, wherein the alkali metal compound is selected from the group consisting of alkali metal halides, alkali metal sulfates, alkali metal nitrates, alkali metal orthophosphates, alkali metal polyphosphates, alkali metal bases, and mixtures thereof.

6. The process as set forth in claim 2 wherein the neutral to basic alkali metal compound is a potassium halide which is present in an amount sufficient to provide 150 p.p.m. to 50,000 p.p.m. of potassium content.

7. The process as set forth in claim 6 wherein said neutral to basic alkali metal compound is potassium chloride and is present in an amount sufficient to provide 750 p.p.m. to 4,000 p.p.m. of potassium content.

8. An alkaline earth metal pyrophosphate suitable for use as a dentifrice abrasive resulting from a process which comprises (1) admixing a monobasic dialkaline-earth metal orthophosphate with a neutral to basic alkali metal compound which is present in an amount sufficient to provide 650 p.p.m. to 20,000 p.p.m. of alkali metal content based on a total weight of said resultant mixture; said neutral to basic compound when dissolved in distilled water at 26° C. at a concentration of 1% by weight being further characterized in that it will release alkali metal cations within the aforesaid concentration range and also provides a pH above 6.5 and (2) calcining to molecularly dehydrate the aforesaid resultant mixture to form said pyrophosphate.

9. The pyrophosphate as set forth in claim 8 wherein the neutral to basic alkali metal compound is a potassium halide which is present in an amount sufficient to provide 150 p.p.m. to 50,000 p.p.m. of potassium content.

References Cited
UNITED STATES PATENTS

| | | | |
|---|---|---|---|
| 2,511,249 | 6/1950 | Durgin et al. | 23—106 |
| 2,749,278 | 6/1956 | Moss | 23—108 X |
| 2,876,167 | 3/1959 | Manahan | 167—93 |
| 2,962,354 | 11/1960 | Edwards | 23—106 |
| 3,066,056 | 11/1962 | Schlaeger et al. | 23—108 |
| 3,112,247 | 11/1963 | Schweizer | 23—108 X |
| 3,230,041 | 1/1966 | Edwards et al. | 23—107 |

OSCAR R. VERTIZ, *Primary Examiner.*

O. F. CRUTCHFIELD, ARTHUR GREIF,
*Assistant Examiners.*